Sept. 10, 1946. W. F. PECK 2,407,511
PROJECTION APPARATUS
Filed Dec. 9, 1942 2 Sheets-Sheet 2
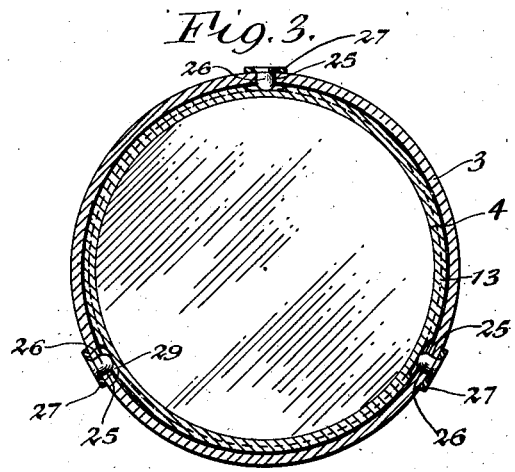
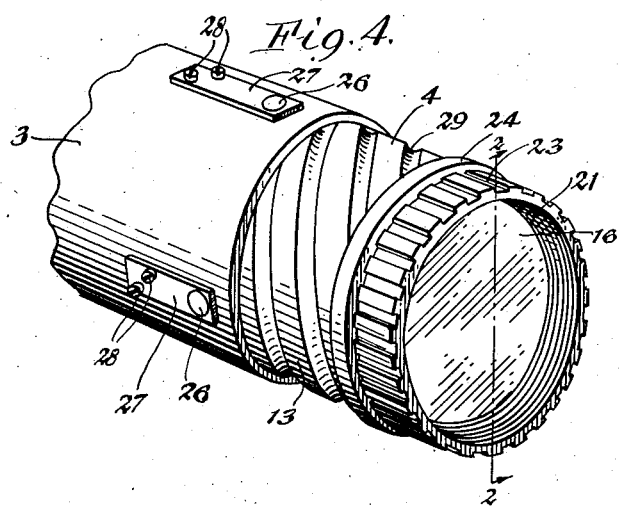
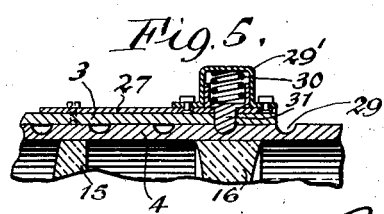
INVENTOR.
WILLIAM F. PECK
BY Raymond A. Paquin
ATTORNEY Patented Sept. 10, 1946

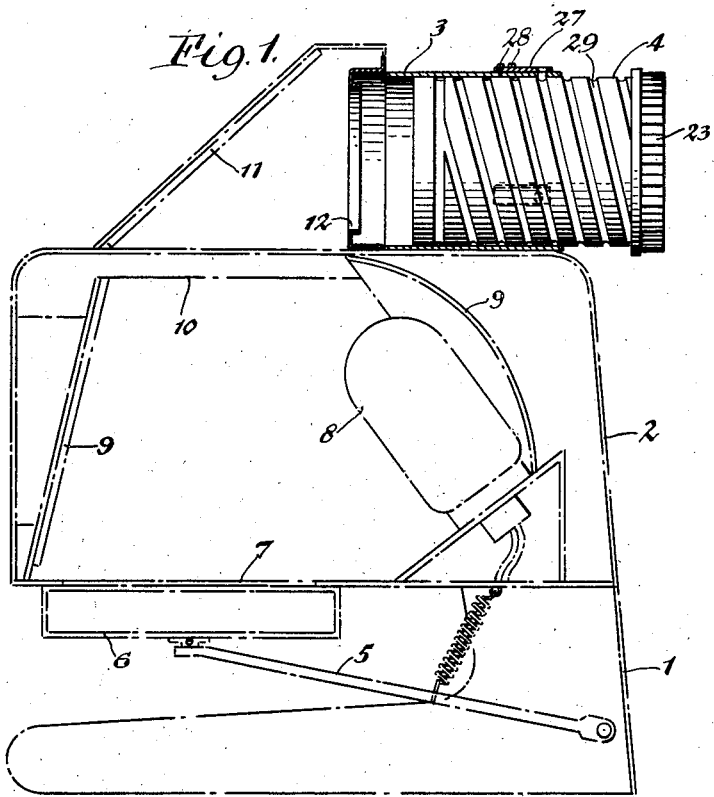
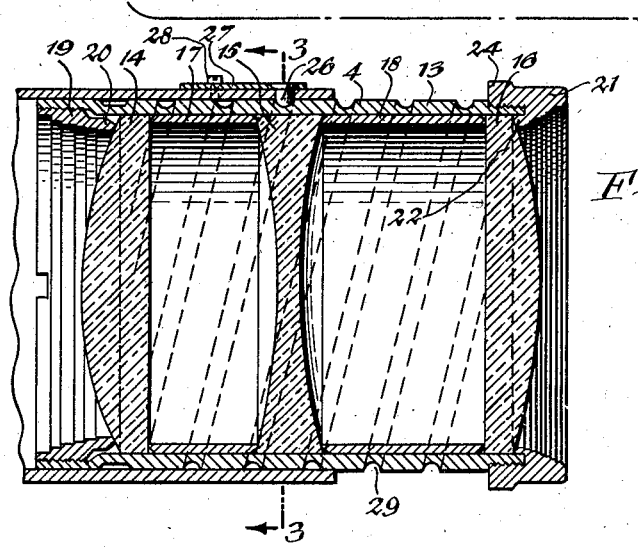

2,407,511

UNITED STATES PATENT OFFICE 2,407,511

PROJECTION APPARATUS

William F. Peck, Buffalo, N. Y., assignor, by mesne assignments, to American Optical Company, Southbridge, Mass., a voluntary association Application December 9, 1942, Serial No. 468,368

3 Claims. (Cl. 88—57)

This invention relates to projection apparatus and has particular reference to a new and improved support for the lens system of such an apparatus.

An object of the invention is to provide a new and improved means for adjustably supporting the support for the lens system of a projection apparatus.

Another object of the invention is to provide new and improved means for positioning the lens system of a projector which means retains the axial position of the lens system for any required adjustment and particularly where said lens system is in extended position.

Another object of the invention is to provide a new and improved means for adjustably supporting the support for the lens system of a projection apparatus which provides both coarse and fine adjustment for focusing said lens system.

Another object of the invention is to provide a new and improved bearing construction for an adjustable support of the type set forth.

Another object of the invention is to provide a new and improved means for adjustably supporting a support for a lens system for a projector or the like which has bearing means for the axial adjustment of the lens system and which reduces the friction between the bearing means and support.

Other objects and advantages of the invention will be apparent from the following description taken in connection with the accompanying drawings and it will be understood that many changes may be made in the details of construction and arrangement of parts without departing from the spirit of the invention as expressed in the accompanying claims. I therefore do not wish to be limited to the exact details of construction and arrangement of parts shown and described as the preferred form has been shown by way of illustration only.

Referring to the drawings:

Fig. 1 is a side view partially in section of a projection apparatus embodying the invention.

Fig. 2 is a sectional view on an enlarged scale taken on line 2—2 in Fig. 4.

Fig. 3 is a sectional view taken on line 3—3 of Fig. 2 looking in the direction of the arrows.

Fig. 4 is a perspective view showing the lens supporting means in its support; and Fig. 5 is a fragmentary sectional view showing another form of bearing means.

In the past supporting means for the projection lens system of projectors or the like have usually comprised a tubular member containing the lens elements which tubular member was slideable within a sleeve or the like on the projector until the lens system was adjusted to desired focussed position. Another form employed a detent member in the outer sleeve which engaged a thread in the tubular lens support to cause said lens support to move in or out when the lens supporting tube was rotated.

One particular defect with both of these systems was that when the said tubular member was in extended or extreme out position the axis of the lens system in the support was not retained in axial alignment with the optical system of the instrument.

It is therefore one of the principal objects of this invention to provide a new and improved means for supporting the lens supporting means of a projector or the like which will retain the axis of the lens system in axial alignment with the projector system for any required adjustment of the lens system and particularly where the lens system is in extended or extreme out position, and therefore overcome the difficulty present with prior art constructions as set forth above.

Referring more particularly to the drawings wherein similar reference characters designate corresponding parts throughout the several views, the invention is shown applied to a projector for projecting opaque material such as pages of a book, etc., but it will be understood that the invention may be applied to other projection apparatus or to other similar uses where it is desired to adjustably support a tubular member relative to a tubular support. The apparatus embodying the invention as shown in the drawings comprises a base 1 on which is positioned a cabinet or casing 2 on which is positioned the cylindrical support 3 containing the tubular lens support member 4. On the base 1 is pivotally mounted the platen support 5 on which is pivotally mounted the platen 6 adapted to overlie an opening 7 in the base of the casing 2. In the casing 2 is positioned the lamp or bulb 8 which is adapted with the help of reflectors 9 and 10 to brightly illuminate the material on the platen 7 so that the reflector 11 can pick up an image of said material and reflect same through the objective or projecting lens system in the support 4.

The cylindrical support or tube 3 for the tubular lens supporting member 4 is secured to the casing 2 adjacent the upper end thereof and at its inner end said support 3 is provided with a light shield or the like having the inturned flange 12 adapted to prevent the leakage or loss of light through the space between the periphery of the lens supporting tube 4 and the inner surface of said tubular support 3.

The lens tube member 4 is preferably formed of Bakelite or other suitable plastic composition, although this member may be formed of any other desired material. This lens support 4 comprises a cylindrical or barrel member 13 adapted to contain the objective lenses 14, 15 and 16. Between the lens elements 14 and 15 is positioned the spacing ring 17 of Bakelite or other suitable material and between the lens elements 15 and 16 is positioned the cylindrical spacing ring 18 of Bakelite or other suitable material.

Adjacent one end of the member 13 is a ring member 19 having an exteriorly threaded portion adapted to engage an interior threaded portion adjacent said end of said cylindrical member 13 and said member 19 also has its inner end 20 engaging the outer surface of the lens element 14. Adjacent the opposite end of said cylindrical member 13 is positioned a cap member or ring 21 which has a threaded portion engaging the threaded portion on the outer surface of the cylindrical member 13 and said member 21 also has a portion 22 engaging the outer surface of the lens element 16.

This cap member 21 is preferably formed with a serrated outer surface 23 and also has a shoulder portion 24 which is adapted to act as a stop to limit the adjustment of said member 13 or the tube 4 relative to the support 3.

At spaced points in the periphery of said support 3 and preferably adjacent the forward end thereof are provided the openings 25 through which are extended the projections 26 which projections are secured to blade spring members or the like 27 and these spring members are secured to the support 3 by the screws 28 or other suitable means. In the drawings there are shown three such openings 25 and three projecting members 26 and each of said projection members 26 is shown secured to a respective resilent member or blade spring 27. It will be understood that while the number of such projecting members has been shown as three that any other desired number thereof may be employed so long as the numbers thereof are sufficient to retain said lens supporting cylinder 4 in alignment relative to said support 3. The three projections shown are preferably spaced at 120 degree intervals in the periphery of said support 3. If the number of such bearing members were four, then they could be spaced at 90 degree intervals or other spacing that will provide the desired bearing support for the tube 4.

In the periphery of the lens supporting tube 4 there is provided a series of grooves or threads 29, the number of said grooves or threads depending upon the number of projection members 26, that is, one groove or thread is provided for each projection member. In this way each of said projection or bearing members 26 is adapted to engage its respective groove or slot 29 to support said tube 4 in axial alignment as stated above and also to cause movement of said tube in or out, depending upon the direction of turning of the serrated ring 23 and tube 4.

It will be seen that because of the resilient supports 27 for the projection or detents 26 that it is possible to coarsely adjust said tube 4 by sliding the tube 4 axially in the support 3 until the approximate desired position is reached and then by allowing the said detents 26 to engage their respective slots the said tube 4 may be finely adjusted to focus the lens system.

In Fig. 5 there is shown a modified form of projection or detent member in which the spring or resilient member 27 has secured thereto the cap member 29' containing the coil spring 30 and plunger member 31 which is adapted to extend through an opening in the tube 3 and into the slot or groove 29 as described above. In this form the resilent member 27 may be omitted and the cap member 29' secured directly to the tubular member 3.

It will be seen from the above that by employing the arrangement of this application the axial position of the lens tube will be retained for any required adjustment and particularly for positions where the lens system or objective is in extended or extreme out position.

From the foregoing it will be seen that I have provided simple, and efficient means for obtaining all of the objects and advantages of the invention.

Having described my invention, I claim:

1. In a device of the character described, for supporting a lens unit in optical alignment with a projection apparatus, a support, a first tubular member mounted on said support, a second tubular member having a portion thereof longitudinally adjustably mounted in said first tubular member, said second tubular member having groove means on the wall thereof adjacent said first tubular member for adjusting said second tubular member relative to said first tubular member, three or more circumferentially spaced detent members carried by said first tubular member and engaging said grooves in said second tubular means, means for resiliently urging at least one of said detent members toward said second tubular member, said detent members having portions engaging said groove means at spaced intervals to support said second tubular member within said first tubular member and prevent sagging or tilting of said second tubular member within said first tubular member while allowing adjustment thereof for focusing the lens system carried thereby and a circumferential light trap adjacent the inner end of said first tubular member and extending over the space between said tubular members and adapted to prevent the leakage of light between said tubular members.

2. In a device of the character described, for supporting a lens unit in optical alignment with a projection apparatus, a support, a first tubular member carried by said support, a second tubular member longitudinally adjustable in said first tubular member, said second tubular member having groove means in the wall thereof, three or more resiliently urged detent members in circumferentially spaced relation on said first tubular member, said detent members having portions extending through openings in said first tubular member and engaging said groove means at spaced intervals to support said second tubular member within said first tubular member and prevent sagging or tilting of said second tubular member within said first tubular member while allowing adjustment thereof for focusing the lens system carried thereby, and a flange member adjacent the inner end of said first tubular member and overlying the space between said tubular members and forming a circumferential light trap to prevent the leakage of light between said tubular members.

3. A lens mount comprising a cylindrical support approximately horizontally arranged and having at least three apertures approximately evenly spaced circumferentially about one end of said support, a cylindrical lens tube member for carrying a lens system and having a loose sliding fit in said cylindrical support and provided with a plurality of spiral grooves corresponding in number to said apertures similarly spaced circumferentially on the periphery of said tube member, the fit of said tube member in said cylindrical support being a sufficiently loose fit to give commercially inexpensive tolerances and relatively low friction therebetween, and resilient mounting means secured upon the outer surface of said cylindrical support and carrying detents extending through said apertures, said detents having rounded inner ends extending into and cooperating with respective spiral grooves for affording longitudinal fine adjusting movement of said lens tube member relative to said cylindrical support upon rotation of said lens tube member, the resilient mounting means for said detents maintaining the inwardly projecting rounded end portions of said detents pressed against the bottoms of said grooves when the tube member is positioned for said fine adjustment, said resilient mounting means also being sufficiently flexible to yield when an axial pressure is exerted upon the exposed end of said tube member to cause the rounded inner ends to simultaneously leave said grooves as said tube member moves axially, whereby a horizontal sliding movement of said tube member relative to said cylindrical support may be affected to produce a coarse adjustment of said lens tube member relative to said support.

WILLIAM F. PECK.